United States Patent
Staeck et al.

(10) Patent No.: US 11,469,425 B2
(45) Date of Patent: Oct. 11, 2022

(54) HUMIDIFIER, FUEL CELL DEVICE WITH A HUMIDIFIER AND MOTOR VEHICLE WITH A FUEL CELL DEVICE COMPRISING A HUMIDIFIER

(71) Applicants: AUDI AG, Ingolstadt (DE); Volkswagen AG, Wolfsburg (DE)

(72) Inventors: Rune Staeck, Gifhorn (DE); Christian Lucas, Braunschweig (DE); Oliver Berger, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 17/275,121

(22) PCT Filed: Aug. 13, 2019

(86) PCT No.: PCT/EP2019/071677
§ 371 (c)(1),
(2) Date: Mar. 10, 2021

(87) PCT Pub. No.: WO2020/052888
PCT Pub. Date: Mar. 19, 2020

(65) Prior Publication Data
US 2022/0052358 A1 Feb. 17, 2022

(30) Foreign Application Priority Data
Sep. 11, 2018 (DE) .................... 10 2018 215 370.1

(51) Int. Cl.
*H01M 8/04014* (2016.01)
*H01M 8/04119* (2016.01)
*H01M 8/10* (2016.01)

(52) U.S. Cl.
CPC ... *H01M 8/04014* (2013.01); *H01M 8/04149* (2013.01); *H01M 8/10* (2013.01); *H01M 2008/1095* (2013.01); *H01M 2250/20* (2013.01)

(58) Field of Classification Search
CPC ......... H01M 8/04014; H01M 8/04149; H01M 8/10; H01M 2008/1095; H01M 2250/20
See application file for complete search history.

(56) References Cited

U.S. PATENT DOCUMENTS

| | | | |
|---|---|---|---|
| 3,497,423 A | 2/1970 | Rodgers | |
| 5,599,688 A | 2/1997 | Grass | |

(Continued)

FOREIGN PATENT DOCUMENTS

| | | |
|---|---|---|
| DE | 10 2013 221 881 A1 | 4/2015 |
| DE | 10 2015 218 751 A1 | 3/2017 |

(Continued)

OTHER PUBLICATIONS

English translation of DE Publication 102016200410, Jul. 2017.*

*Primary Examiner* — Brittany L Raymond
(74) *Attorney, Agent, or Firm* — Seed IP Law Group LLP

(57) ABSTRACT

A humidifier comprises at least one humidifier module, which has a membrane permeable to water vapor and respectively on both sides of the membrane, a flow field frame with at least two walls defining a flow channel. A thermal bridge with an increased thermal conductivity compared to the membrane protrudes through the membrane. A fuel cell device comprises such a humidifier and a motor vehicle includes a fuel cell device comprising such a humidifier.

7 Claims, 5 Drawing Sheets

(56) References Cited

U.S. PATENT DOCUMENTS

| | | | | |
|---|---|---|---|---|
| 5,891,222 | A | * | 4/1999 | Hilgendorff ......... B01D 63/084 96/7 |
| 6,106,964 | A | * | 8/2000 | Voss ................... H01M 8/04119 429/413 |
| 9,956,528 | B2 | * | 5/2018 | Lienhard .............. B01D 63/082 |
| 2004/0258968 | A1 | | 12/2004 | Voss et al. |
| 2014/0238235 | A1 | * | 8/2014 | Liu ..................... B01D 63/084 95/52 |

FOREIGN PATENT DOCUMENTS

| | | | |
|---|---|---|---|
| DE | 10 2016 200 410 A1 | | 7/2017 |
| DE | 102016200410 | * | 7/2017 |
| WO | 2010/139344 A1 | | 12/2010 |

* cited by examiner

HUMIDIFIER, FUEL CELL DEVICE WITH A HUMIDIFIER AND MOTOR VEHICLE WITH A FUEL CELL DEVICE COMPRISING A HUMIDIFIER

BACKGROUND

Technical Field

Embodiments of the invention relate to a humidifier with at least one humidifier module, which has a membrane permeable to water vapor and respectively on both sides of the membrane a flow field frame with at least two walls defining a flow channel. Embodiments of the invention further relate to a fuel cell device comprising a humidifier and to a motor vehicle with a fuel cell device comprising a humidifier.

Description of the Related Art

Fuel cells are used to provide electrical energy in an electrochemical reaction, which can be used, for example, to drive an electric motor. A significant field of application in this context is the use of fuel cells in motor vehicles, wherein the associated power requirement leads to several fuel cells being combined to form a fuel cell stack, so that there is a correspondingly high requirement for the supply of the reactants, namely a fuel, usually hydrogen, on the one hand, and an oxygen-containing gas, usually air, on the other. A compressor which compresses the air is used for the provision of a sufficient quantity of air in a fuel cell device comprising the fuel cell stack, wherein this is associated with a significant increase in its temperature, so that there is a requirement to condition the air before it is fed into the fuel cell stack, i.e., to adjust it to the conditions required for the operation of the fuel cells in the fuel cell stack. For this purpose, a humidifier is used, in which a transfer of moisture from the moist exhaust gas of the fuel cell stack to the dry, compressed air originating from the compressor takes place.

DE 10 2016 200 410 A1 discloses a membrane humidifier constructed as a plate humidifier, in which the flow plates have a first gas channel, a second gas channel and a cooling channel in order to be able to extract as much thermal energy as possible from the air coming from the compressor by means of a cooling medium flowing through the cooling channel.

In US 2004/0258968 A1, a humidifier is disclosed in which the water vapor-permeable membrane is provided in the form of a perforated metal sheet whose pores are filled with a water vapor-permeable material so that only a small portion of the membrane area is available for the water vapor exchange.

BRIEF SUMMARY

Embodiments of the invention are therefore based on the task of providing a humidifier with a sufficiently large membrane for effective humidification of the supply air for a fuel cell stack, with its exhaust air as a simple temperature control option. The task is further to provide an improved fuel cell device, as well as an improved motor vehicle.

It should be noted that the thermal conductivity of the membrane is insufficient to achieve the desired temperature control and this can also not be improved in a simple manner, for example, by adding metallic filler elements, as this would have a negative effect on the transport of water in the membrane, so that, in DE 10 2016 200 410 A1, a cooling channel is provided inside the flow plate, wherein, as a result, the volume occupied is not available for the supply air and the exhaust air of the fuel cell stack. In contrast, as described herein, a thermal bridge is provided, the thermal conductivity of which is increased relative to the membrane, wherein this thermal bridge protrudes through the membrane and thereby enables a heat transfer from the one flow channel on one side of the membrane to the other flow channel on the opposite side of the membrane.

The humidifier with the provided humidifier module is also characterized in that it is easily scalable and can therefore be adapted to performance requirements and, in particular, can be designed in such a way, when conditioning the supply air for a fuel cell stack with a plurality of fuel cells, that the humidifier module is provided multiple times, with a plurality of membranes separated by the flow field frames, wherein each flow field frame has a plurality of the flow channels with associated walls.

The thermal bridge can be designed in a simple manner inasmuch as at least one pin, that protrudes through the membrane into a pin seat of the frame that is opposite, is formed on one of the flow field frames, wherein the heat transfer can also be improved by providing a plurality of pins and a corresponding number of pin seats which are associated with the walls. In this, the pins and the pin seats are, in particular, an integral part of the walls, so that no additional installation space is required in order to provide the required thermal properties in the humidifier, which is, in particular, an option when the walls themselves, as part of the flow field frames, are formed from a material with good thermal conductivity, for example a metal or a plastic with high thermal conductivity. With regard to this plastic, reference can be made, by way of example, to the product Alcom PA66 910/32.1 GF8 TCE8 of the company Albis.

It is also possible for a partial quantity of the flow field frames to have the pins on both sides assignable to the adjacent membrane and for a complementary set of the flow field frames, complementary to the partial quantity, to have the pin seats on both sides. In particular, this offers the advantage that the required tightness can thus be produced by means of an interference fit, since the majority of the humidifier modules provided are usually pressed between two end plates. If no distinction is made between the two partial quantities, there is the advantage that the same flow field frames can be used for both the supply air and for the exhaust air.

A fuel cell device with a humidifier described above is characterized in that it has reduced installation space requirements. The advantages mentioned in connection with the humidifier also correspondingly apply to the fuel cell device.

In the case of a motor vehicle with a fuel cell device having such a humidifier, there are also advantages in reduced installation space for the fuel cell device, since there is an integrated concept for the heat exchanger and the water separator.

DETAILED DESCRIPTION

Figure 1:
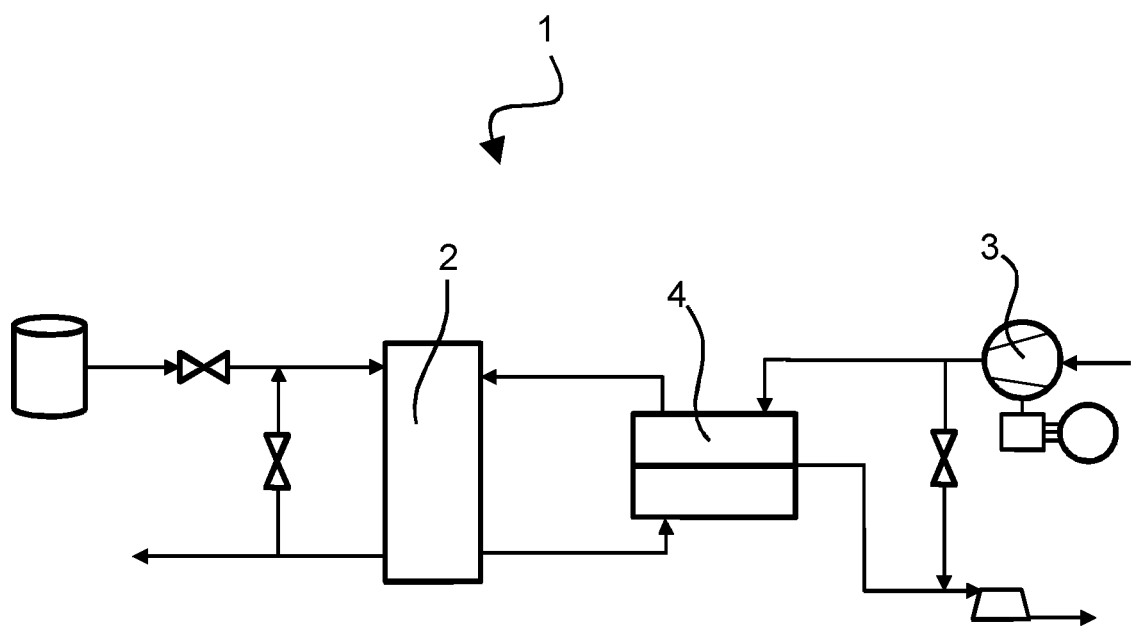
FIG. 1 shows a highly schematic representation of a fuel cell device comprising a humidifier.

FIG. 1 shows a part of a fuel cell device 1, wherein the fuel cell device 1 comprises a device for regulation of humidity of a plurality of fuel cells combined in a fuel cell stack 2.

Each of the fuel cells comprises an anode, a cathode, and a proton-conductive membrane separating the anode from the cathode. The membrane is formed from an ionomer, such as a sulfonated tetrafluoroethylene polymer (PTFE) or a perfluorinated sulfonic acid (PFSA) polymer. Alternatively, the membrane may be formed as a hydrocarbon membrane.

A catalyst may additionally be admixed to the anodes and/or the cathodes, wherein the membrane may be coated on its first side and/or on its second side with a catalyst layer made of a noble metal or a mixture comprising noble metals such as platinum, palladium, ruthenium or the like, which serve as reaction accelerators in the reaction of the respective fuel cell.

Fuel (e.g., hydrogen) can be supplied to the anode via an anode compartment. In a polymer electrolyte membrane fuel cell (PEM fuel cell), fuel or fuel molecules are split into protons and electrons at the anode. The PEM allows the protons to pass through, but is impermeable to the electrons. For example, the reaction: $2H_2 \rightarrow 4H^+ + 4e^-$ (oxidation/electron release) occurs at the anode. Whereas the protons pass through the PEM to the cathode, the electrons are conducted to the cathode or to an energy storage device via an external circuit.

The cathode gas (e.g., oxygen or oxygen-containing air) can be supplied to the cathode via a cathode compartment, so that the following reaction takes place on the cathode side: $O_2 + 4H^+ + 4e^- \rightarrow 2H_2O$ (reduction/electron capture).

To ensure ionic conductivity for hydrogen protons through the PEM, the presence of water molecules in the PEM is required. For this reason, the cathode gas is, in particular, humidified before it is supplied to the fuel cell to bring about moisture saturation of the PEM.

Since several fuel cells are combined in the fuel cell stack 2, a sufficiently large amount of cathode gas must be provided, such that a large cathode gas mass flow is provided by a compressor 3, wherein as a result of the compression of the cathode gas, its temperature increases greatly. The conditioning of the cathode gas, i.e., its adjustment with respect to the parameters desired in the fuel cell stack 2, takes place in a humidifier 4.

Figure 2:
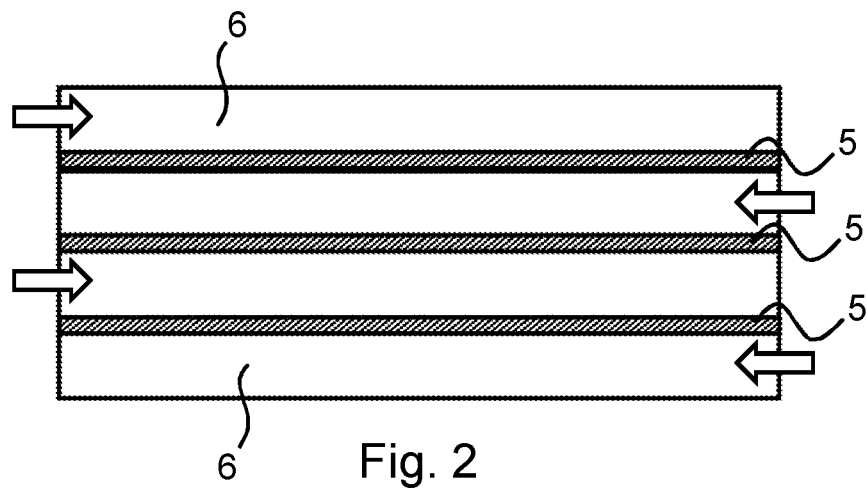
FIG. 2 shows a longitudinal section through a section of a humidifier.
Figure 3:
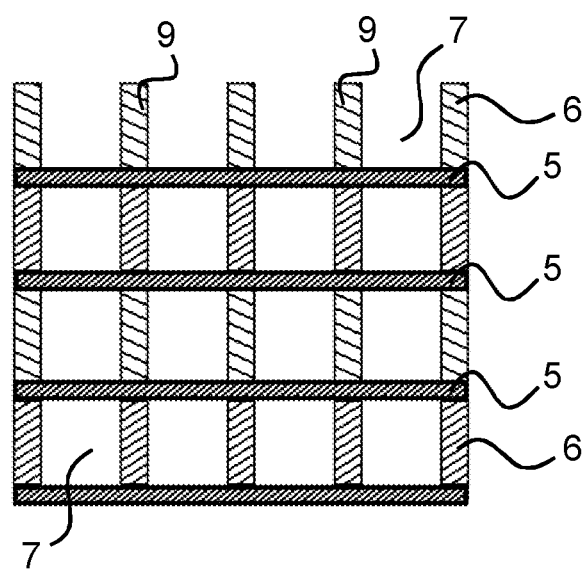
FIG. 3 shows a cross-section through a section of a humidifier.

FIG. 2 and FIG. 3 show a humidifier known from the state of the art. Three membranes 5 are shown in FIG. 2, the alternating flow field frames 6 of which are assigned to a flow channel 7 for moist exhaust air and for the dry supply air, the flow and flow direction of which are symbolized by the arrows. FIG. 3 shows a view from the side of the construction of FIG. 2, where, in particular, the plurality of flow channels 7 formed in the flow field frames 6 can be seen. The membrane 5 located between the flow channels 7 in the flow field frames 6 makes it possible to humidify the dry supply air due to its water vapor-permeable property, wherein due to the low thermal conductivity of the membrane 5, the desired temperature control cannot be achieved.

Figure 4:
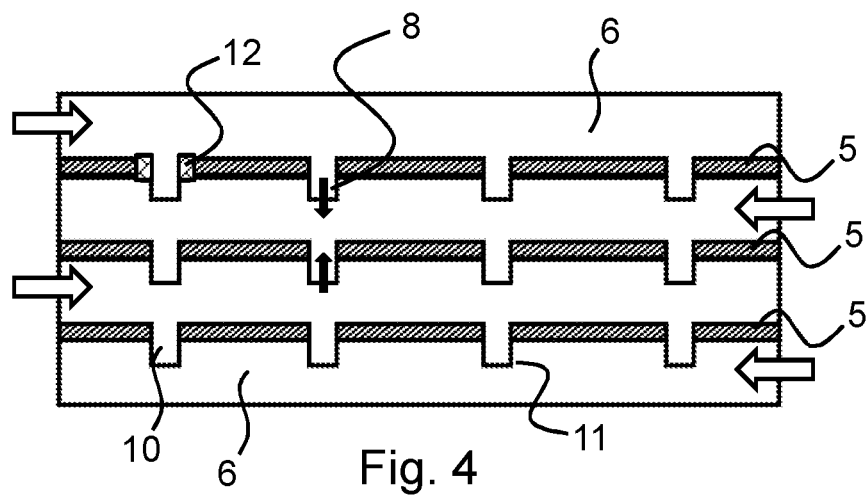
FIG. 4 shows a representation corresponding to FIG. 2 of an embodiment of a humidifier.
Figure 5:
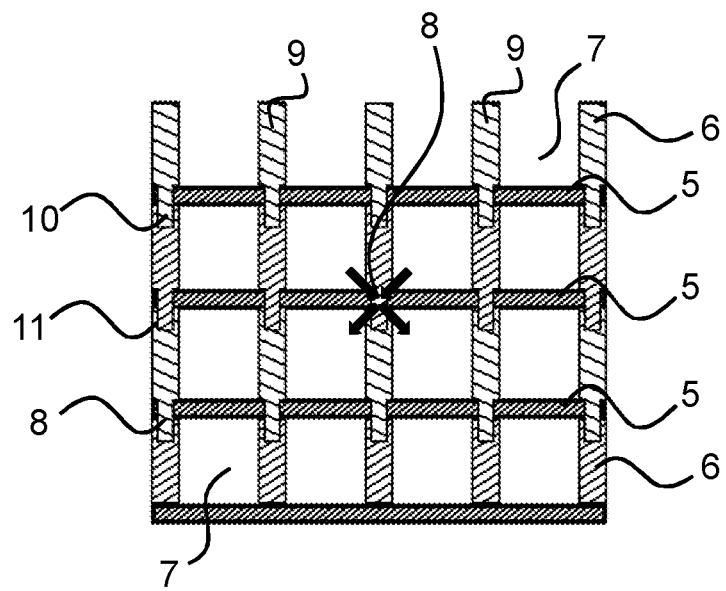
FIG. 5 shows a representation corresponding to FIG. 3 of an embodiment of a humidifier.
Figure 6:
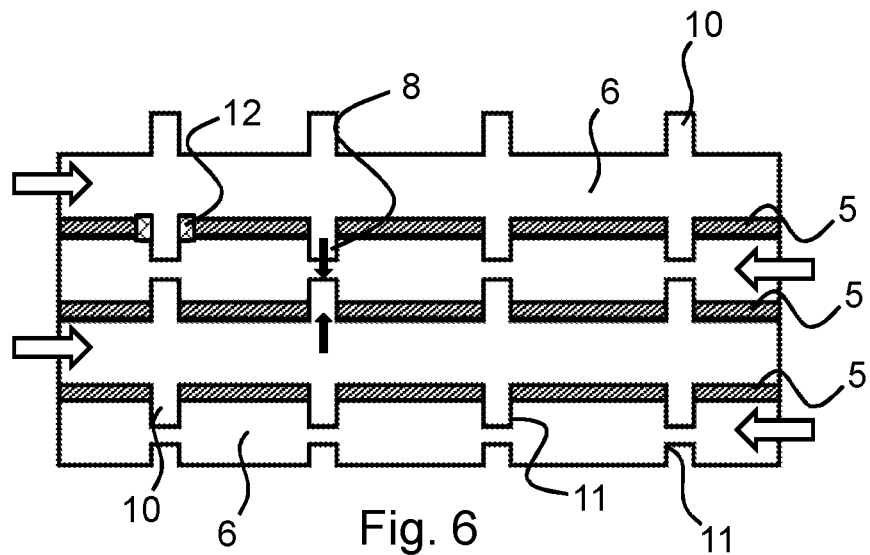
FIG. 6 shows a representation corresponding to FIG. 4 of a further embodiment of a humidifier.
Figure 7:
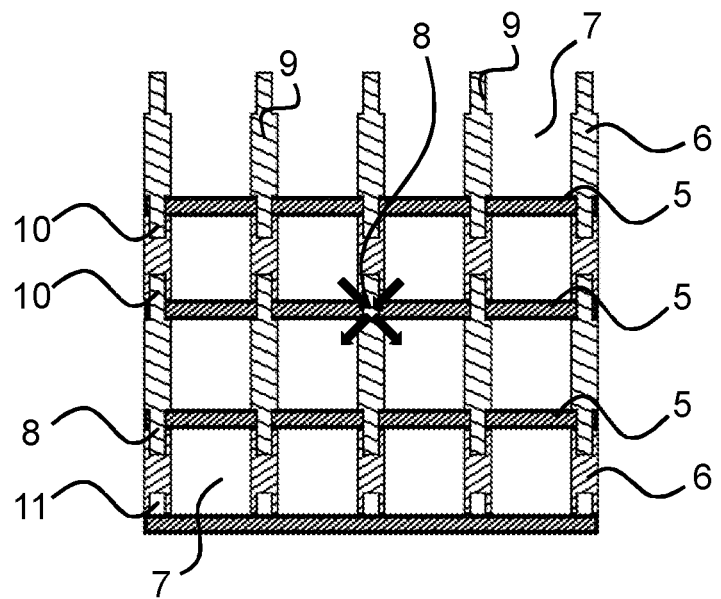
FIG. 7 shows a representation corresponding to FIG. 6 as shown in FIG. 5.
Figure 8:
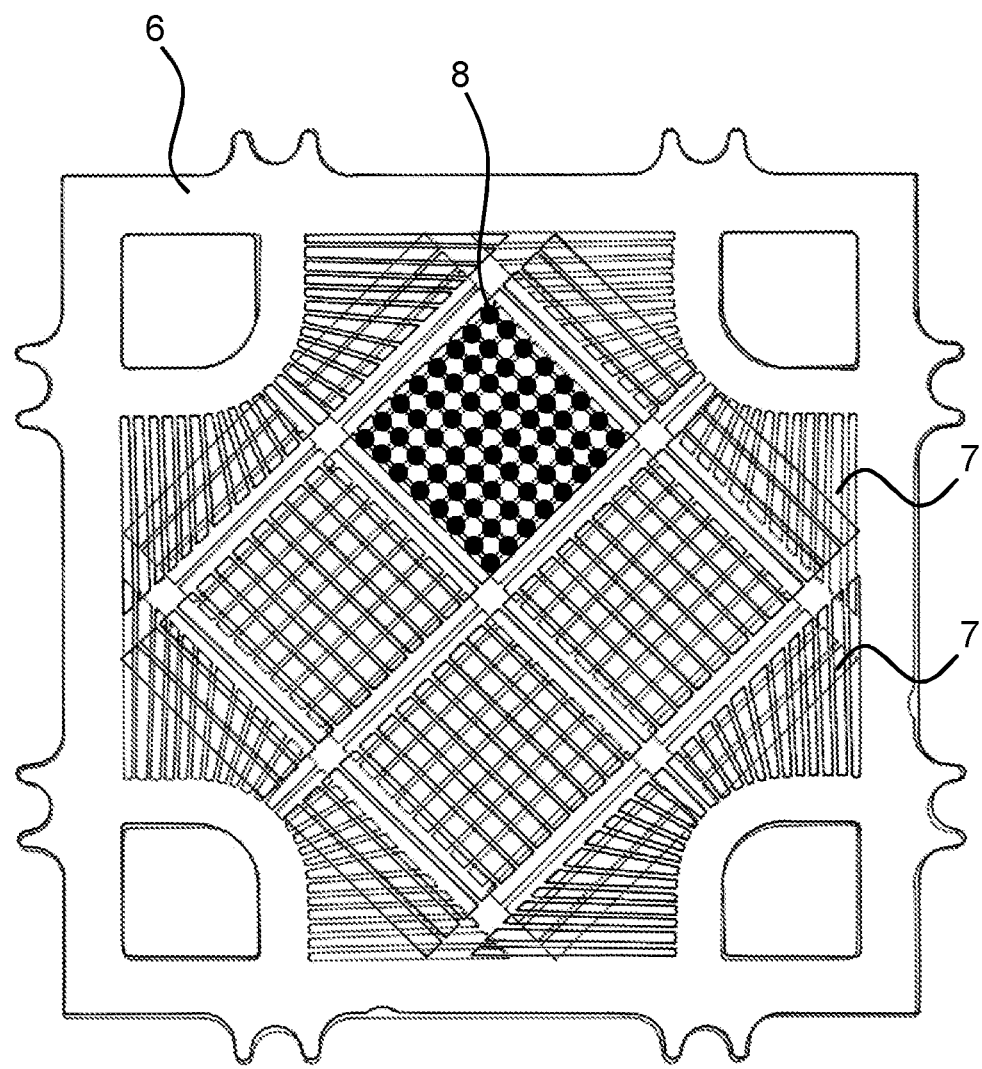
FIG. 8 shows a top view of a flow field frame with flow fields rotated 90 degrees and the thermal bridges arranged at the intercepts.

FIG. 4 shows a representation of an embodiment, comparable to FIG. 2, of a humidifier 4, formed as described herein, in which a heat transfer indicated by the filled-out arrows is made possible by a thermal bridge 8. For this purpose, the thermal bridge 8 protrudes through the membrane 5. The thermal conductivity of the thermal bridge 8 is increased compared to that of the membrane 5. Since, in this embodiment example, there is a plurality of humidifier modules with a plurality of membranes 5 separated by the flow field frames 6, there is also a plurality of flow channels 7 with associated walls 9 and a plurality of pins 10 and pin seats 11 forming the thermal bridge 8. The pins 10 and the pin seats 11 are associated with the walls 9, which themselves consist of a material with good thermal conductivity, for example a metal. The dimensions of the pins 10 are adapted to the dimensions of the pin seats 11 for good heat transfer; in particular, the pins 10 are arranged to fit precisely in the pin seats 11 and/or are pressed into them. FIG. 4 shows an embodiment in which the flow field frames 6 for the supply air and for the exhaust air are of identical design, i.e., have the pins 10 on one side and the pin seats 11 on the other side, whereas FIG. 6 shows an alternative embodiment in which a partial quantity of the flow field frames 6 has the pins 10 on both sides assignable to the adjacent membrane 5 and the complementary set of the flow field frames 6 has the pin seats 11 on both sides.

It should moreover be noted that the thermal bridges 8 are sealed off from the membrane 5, this being achieved by sealing off the pins. This can be achieved, for example, by O-rings 12 or glued joints or an interference fit that becomes effective when the humidifier modules are tensioned.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A humidifier, comprising:
at least one humidifier module that comprises:
a membrane permeable to water vapor;
a first flow field frame with at least two first walls defining a first flow channel on a first side of the membrane;
a second flow field frame with at least two second walls defining a second flow channel on a second side of the membrane opposite the first side; and
a thermal bridge with a higher thermal conductivity than the membrane, wherein the thermal bridge protrudes through the membrane,
wherein the thermal bridge is sealed off from the membrane;
wherein the thermal bridge includes a pin that protrudes through the membrane from the first side of the membrane to a pin seat in the second flow field frame, and
wherein the pin is formed as one piece with the first walls and/or the pin seat is arranged in the second walls.

2. The humidifier according to claim 1, wherein the humidifier includes a plurality of humidifier modules collectively having a plurality of membranes separated by flow field frames, and wherein each flow field frame has a plurality of flow channels with associated walls.

3. The humidifier according to claim 2, wherein each of a first plurality of the flow field frames have pins on opposing sides thereof, and each of a second plurality of the flow field frames have pin seats on opposing sides thereof, wherein the first plurality of the flow field frames alternates with the second plurality of the flow field frames.

4. The humidifier according to claim 1, wherein a plurality of pins, which are associated with the first walls, and a corresponding number of pin seats, which are associated with the second walls, are provided.

5. The humidifier according to claim 1, wherein the first and second flow field frames are formed from a material with higher conductivity than the membrane.

6. A fuel cell device with a humidifier comprising:
   at least one humidifier module that comprises:
      a membrane permeable to water vapor;
      a first flow field frame with at least two first walls defining a first flow channel on a first side of the membrane;
      a second flow field frame with at least two second walls defining a second flow channel on a second side of the membrane opposite the first side; and
      a thermal bridge with a higher thermal conductivity than the membrane, wherein the thermal bridge protrudes through the membrane,
   wherein the thermal bridge is sealed off from the membrane;
   wherein the thermal bridge includes a pin that protrudes through the membrane from the first side of the membrane to a pin seat in the second flow field frame, and
   wherein the pin is formed as one piece with the first walls and/or the pin seat is arranged in the second walls.

7. A motor vehicle with a fuel cell device which has a humidifier comprising:
   at least one humidifier module that comprises:
      a membrane permeable to water vapor;
      a first flow field frame with at least two first walls defining a first flow channel on a first side of the membrane;
      a second flow field frame with at least two second walls defining a second flow channel on a second side of the membrane opposite the first side; and
      a thermal bridge with a higher thermal conductivity than the membrane, wherein the thermal bridge protrudes through the membrane,
   wherein the thermal bridge is sealed off from the membrane;
   wherein the thermal bridge includes a pin that protrudes through the membrane from the first side of the membrane to a pin seat in the second flow field frame, and
   wherein the pin is formed as one piece with the first walls and/or the pin seat is arranged in the second walls.

* * * * *